United States Patent
Lyakhovitskiy

(10) Patent No.: US 8,370,294 B2
(45) Date of Patent: Feb. 5, 2013

(54) FILE STASHING FOR STORAGE MEDIA

(75) Inventor: Grigory B. Lyakhovitskiy, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 12/436,157

(22) Filed: May 6, 2009

(65) Prior Publication Data

US 2010/0287137 A1 Nov. 11, 2010

(51) Int. Cl.
G06F 7/00 (2006.01)
G06F 17/00 (2006.01)

(52) U.S. Cl. ........ 707/609; 707/640; 707/650; 707/652; 707/655; 707/661; 711/161; 711/162

(58) Field of Classification Search ........... 707/609, 707/640, 650, 652, 655, 661, 999.204; 711/161, 711/162
See application file for complete search history.

(56) References Cited

U.S. PATENT DOCUMENTS

| | | | |
|---|---|---|---|
| 6,014,519 A * | 1/2000 | Egashira ................. 717/137 |
| 6,032,227 A | 2/2000 | Shaheen et al. | |
| 6,275,896 B1 * | 8/2001 | Kojima ................. 711/112 |
| 6,442,601 B1 * | 8/2002 | Gampper et al. ........... 709/218 |
| 6,629,200 B1 * | 9/2003 | Kanamaru et al. ........... 711/113 |
| 7,715,411 B2 * | 5/2010 | Makino ................. 370/395.7 |
| 7,966,289 B2 * | 6/2011 | Lu et al. ................. 707/640 |
| 2003/0126247 A1 * | 7/2003 | Strasser et al. ........... 709/223 |
| 2006/0069861 A1 * | 3/2006 | Amano ................. 711/114 |
| 2007/0208748 A1 | 9/2007 | Li | |
| 2007/0263991 A1 * | 11/2007 | Huang ................. 386/126 |
| 2008/0162822 A1 * | 7/2008 | Okuyama et al. .......... 711/134 |
| 2008/0270524 A1 * | 10/2008 | Gupta et al. ........... 709/203 |
| 2008/0271112 A1 * | 10/2008 | Waker et al. ........... 726/1 |
| 2009/0016182 A1 * | 1/2009 | Kubo et al. ........... 369/47.41 |
| 2009/0106255 A1 * | 4/2009 | Lacapra et al. ........... 707/10 |
| 2010/0023679 A1 * | 1/2010 | Blum ................. 711/103 |
| 2010/0198965 A1 * | 8/2010 | Tanaka ................. 709/224 |

OTHER PUBLICATIONS

Moreton Tim, "A Wide-Area File System for Migrating Virtual Machines", Retrieved at<<http://www.cl.cam.ac.uk/techreports/UCAM-CL-TR-714.pdf>>, Technical Report No. 714, Mar. 2008, pp. 163.

Gray Brian,"Introduction to Ripping your DVDs into Video Files", Retrieved at<<http://lowendmac.com/ed/bgray/bg07/0924.html>>, Sep. 24, 2007, pp. 5.

"WebSphere Application Server", Retrieved at<<http://publib.boulder.ibm.com/infocenter/wasinfo/v6r1/index.jsp?topic=/com.ibm.websphere.edge.doc/edge/admingd.htm>>, First edition (May 2006), pp. 197.

Karrer Tony, "Captivate File Size Tricks for Software Training via Simulations", Retrieved at<<http://elearningtech.blogspot.com/2006/03/captivate-file-size-tricks-for.html>>, Mar. 27, 2006, pp. 8.

(Continued)

Primary Examiner — Hares Jami
(74) Attorney, Agent, or Firm — Microsoft Corporation

(57) ABSTRACT

An embodiment of a method includes determining a file size of each of multiple files to be included in a file system image. For each file having a file size less than a lower file size threshold of the storage device currently storing the file, the file is stashed in an alternate storage device having a throughput greater than a throughput of the current storage device. In an example embodiment, files that have sizes within a size range greater than the lower file size threshold are randomly selected for stashing in an alternate storage device. A system includes a file system image generator configured to selectively stash files based on file sizes and a lower file size threshold.

20 Claims, 9 Drawing Sheets

OTHER PUBLICATIONS

Gjoen Stein, "HOWTO: Multi Disk System Tuning", Retrieved at<<http://www.faqs.org/docs/Linux-HOWTO/Multi-Disk-HOWTO.html>>, May 20, 2002, pp. 84.

"Mixed-Media File Systems", Retrieved at<<http://www.ub.utwente.nl/webdocs/inf/1/t000000e.pdf>>, pp. 195, Jun. 1999.

"File Area: Networking", Retrieved at<<http://freegroups.net/macos_files/Networking.shtml>>, May 8, 1998, pp. 179.

* cited by examiner

FILE SYSTEM IMAGING MANAGEMENT DATA 118

| Storage Device 1 | Desired Xfer Rate 1 | Threshold 1 |
|---|---|---|
| Storage Device 1 | Desired Xfer Rate 2 | Threshold 2 |
| Storage Device 2 | Desired Xfer Rate 1 | Threshold 3 |
| Storage Device 3 | Desired Xfer Rate 3 | Threshold 4 |
| Storage Device 3 | Desired Xfer Rate 4 | Threshold 5 |
| Storage Device 3 | Desired Xfer Rate 5 | Threshold 6 |
| ... | ... | ... |
| Storage Device I | Desired Xfer Rate I | Threshold I |

206 — 208 — 210

STORAGE DEVICE LOWER FILE SIZE THRESHOLD TABLE
202

| File 1 | Current Location 1 | Last Access Time 1 |
|---|---|---|
| File 2 | Current Location 2 | Last Access Time 2 |
| File 3 | Current Location 3 | Last Access Time 3 |
| ... | ... | ... |
| File X | Current Location X | Last Access Time X |

212 — 214 — 216

FILE SYSTEM IMAGE ASSEMBLY DATA
204

FIG. 2

FILE STASHING FOR STORAGE MEDIA

BACKGROUND

A disc image is a single file or set of data containing the complete contents and structure of a data storage device, such as a hard drive. Disc images are often created as system backups, or for deployment of commercial application programs or for audio/video content. Disc images are often stored on destination devices that record the images on compact discs (CDs) or digital versatile discs (DVDs), which may be sensitive to the rate at which the data is delivered.

If the data is provided to such destination devices at a rate slower than the destination device optimally records the data, buffer under-run can occur. When buffer under-run occurs, physical damage can occur to the physical media of the destination device, because the destination device must wait for more data to be provided. While the destination device is waiting for more data, the writing element of the device, such as the laser in optical disc drives, may burn the media in a manner that renders the media unreadable.

SUMMARY

Implementations of systems and methods described herein selectively stash files that are to be included in a file system image on a destination device, in order to meet a desired performance objective, such as a desired data transfer rate. Stashing involves storing a file from a source device to an intermediate storage device prior to communicating the file to the destination device. Stashing may be temporary or permanent. The intermediate storage device generally provides higher throughput than the source device. By stashing selected files in intermediate memory, the rate at which files are communicated to the destination device can be managed.

An implementation of a computer implemented method includes determining that a file size of a file to be included in a file system image is less than a lower file size threshold associated with a current storage device currently storing the file, and stashing the file on an intermediate storage device prior to storing the file in the file system image on a destination storage device based on the determination that the file size is less than the lower file size threshold. The method may further include measuring throughput of the current storage device while stashing the file, and adjusting the lower file size threshold if the measured throughput is less than a minimum throughput.

An implementation of a computer program product includes at least one computer storage medium storing computer executable instructions. When executed by a computer, the computer executable instructions cause the computer to carry out a process including determining a file size of each of a plurality of files to be included in a file system image. For each file having a file size less than a lower file size threshold, the file is stashed in an intermediate storage device having a throughput greater than the throughput of a current storage device where the file is currently stored. The process may further include randomly selecting files from the plurality of files that have sizes within a size range greater than the lower file size threshold and stashing the randomly selected files in the intermediate storage device.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 illustrates exemplary files system imaging management data that may be used in accordance with the implementation shown in FIG. 1;

DETAILED DESCRIPTION

Figure 1:
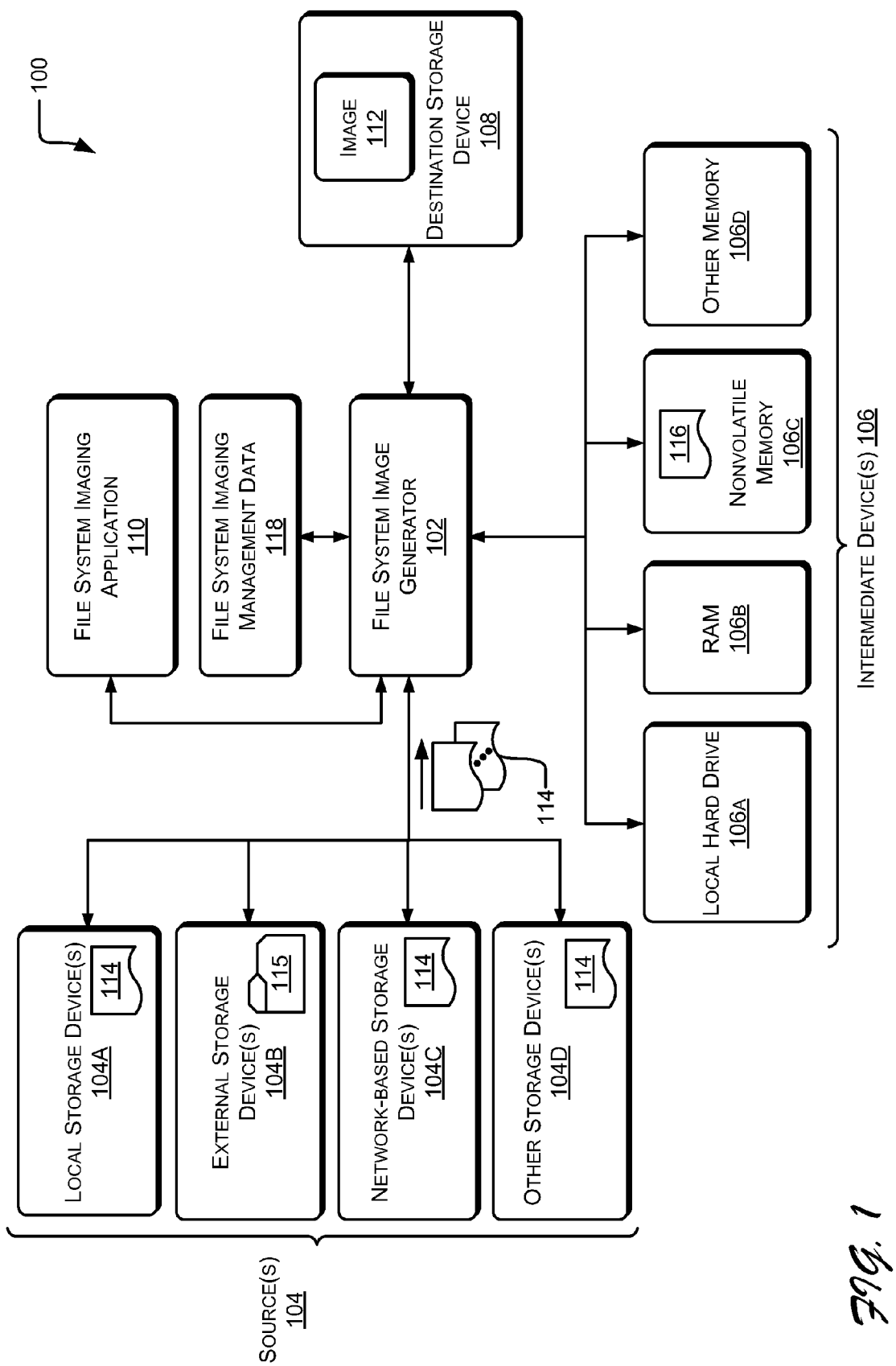
FIG. 1 illustrates an exemplary system for generating a file system image.

When recording files on certain media, there can be buffer under-runs, which arise if the source of the files is unable to keep up with the recording process. Buffer under-runs can cause problems. For example, when files are recorded on optical media of an optical storage device (e.g., an optical disc drive), a buffer under-run can cause physical damage to the media because the laser of the optical storage device may remain too long in one place over the surface of the optical media while the device is waiting for more data to be provided from the source. As a result, buffer under-runs can render the media unreadable.

The source of the files to be recorded may be, for example, a hard disk drive or network server, which may not be able to keep up with the recording process for any number of reasons. These reasons may include limited capabilities of the source, network congestion, or others. One way to prevent buffer under-runs is to stash all the files in another intermediate storage device which is capable of keeping up with the recording process. After all the files are stashed in the intermediate storage device, the files are transferred to the destination device at a data rate that is at least as fast as the destination device reads the data, thereby avoiding an under-run. While stashing all the files in an intermediate storage device solves the problem, this solution has drawbacks. For example, stashing all the files can be a costly use of processing time and computer resources.

In an example implementation discussed further below, prior to sending the files to the destination device, files are selectively stashed in intermediate storage devices that are able to keep up with the recording process. In other words, some files are stashed and other files are not stashed, so that buffer under-runs can be prevented, while conserving resources and minimizing expense. The determination of which files to stash and which files not to stash is based on the data transfer rates of the destination and source devices, as well as the sizes of the files. As is discussed further below, a lower file size threshold is determined, wherein files of sizes below the lower file size threshold are stashed in an intermediate memory.

Furthermore, the process of selectively stashing can be adjusted in real-time to thereby maintain a balance between avoiding buffer under-runs and saving costs, while coping with changes, such as changes in storage device data transfer rate. In an example embodiment files are throughput is measured while certain files are selectively stashed and while certain files are transferred to the destination device. Lower file size threshold for source and intermediate storage devices can be changed in real-time in response to variations in data throughput.

In various implementations, data entities, such as files, to be included in a file system or disc image are selectively stashed to achieve or exceed a performance objective, such as a specified data transfer rate. The specified data transfer rate is a recommended or desired data transfer rate of a destination device that receives the files. Stashing a file refers to storing the file on an intermediate storage device, which is capable of meeting the performance objective, prior to copying the file to a destination device. A file may be stashed temporarily or permanently. For example, a file can be stashed by copying the file from a source storage device to the intermediate storage device, and later copied from the intermediate storage device to the destination device.

Intermediate storage devices may include volatile or non-volatile memory, which can provide for temporary or permanent file stashing. Source storage devices are devices where files originally reside and can include local or remote devices. Intermediate storage devices and source storage devices have various capabilities and designs that impact the rate at which those devices transfer data. Accordingly, the data transfer rates of the various storage devices can impact whether a buffer under-run occurs when transferring files from those devices to a destination device.

With further regard to data transfer rate, the data transfer rate is a function of the time it takes a storage device to open a file, read the file and transmit the file. In implementations discussed below, real-time adjustment of the stashing process is based on storage device throughput, which includes the data transfer rate of a given storage device and other factors impacting the rate of data transmission. For example, when a file is requested from a source storage device, the request may traverse a communication channel and the data from the storage device may traverse the communication channel, which can impart delay in a net or overall rate of data transfer. In implementations discussed below, the throughput of a storage device is the net or overall rate of data transfer.

As is discussed further below, in an example implementation the throughput of a storage device is measured when files of various sizes are transferred from the storage device. The measured throughput is used to calculate a minimum file size threshold. Files having sizes below the minimum file size threshold are stashed in intermediate memory prior to being transferred to the destination device. In one implementation, a file assembly process occurs, in which the files to be included in the image are identified and located. During the assembly process, any file that has a size less than the calculated lower file size threshold is stashed. After a file assembly process the files are copied to a buffer accessible by the destination device. The destination device is typically associated with a desired data transfer rate. The throughput of a storage device that a file is stored on may or may not be sufficient to achieve the desired transfer rate for a given range of file sizes.

As discussed further below, throughput of storage devices may vary as a function of file size. Because throughput for the various storage devices may vary as a function of file size, throughput of a storage device (e.g., source or intermediate storage device) may not be sufficient for files having sizes less than a certain size. Therefore, according to an implementation, file-size dependent throughput of each storage device is monitored to determine a lower file size threshold below which a minimum throughput is not met by each device. Files having sizes below the lower file size threshold for a given storage device are stashed in an intermediate storage device that can provide a higher throughput to the destination device.

In one or more implementations, storage device throughputs that are dependent on file size, are monitored during file stashing and the lower file size thresholds may be adjusted based on the measured throughputs. The lower file size threshold for a given storage device is increased by a determined amount when the storage device's throughput, measured while stashing a file having a size within a certain range below the file size threshold, is less than a certain rate or amount above the desired data transfer rate.

In some implementations, the file-size dependent throughputs of the storage device(s) are measured during recording of the image on media of the destination device, and the lower file size thresholds may be adjusted based on the measured throughputs. The lower file size threshold is set equal to the size of a recorded file plus a certain amount, if during recording of the file, the throughput of the storage device is less than the desired data transfer rate plus a determined amount.

According to various implementations, selected files that would otherwise be communicated to the destination device without being stashed, are nonetheless stashed. In such implementations, files having sizes within a certain range above the lower file size threshold are randomly selected to be stashed. During stashing in these cases, the throughput of the current storage device is checked and the lower file size threshold is adjusted as warranted under the usual stashing process.

FIG. 1 illustrates an example environment 100 in which file system image generation can be carried out according to various implementations. The environment 100 generally includes a file system image generator 102 configured to generate images of files that may be currently stored on one or more sources 104 and/or intermediate devices 106. The generated file system image is communicated to a destination device, such as destination storage device 108. The file system image generator 102 can use one or more alternate storage devices, such as intermediate devices 106, to achieve a desired performance objective, such as a desired data throughput, during the image generation process.

In at least one implementation, the file system image generator 102 is part of the operating system (OS) of a computing device, such as a desktop computer, laptop computer, server computer, or others. For example, the file system image generator 102 may be part of a file system layer or mastering layer of the operating system. A file system imaging application 110 may be included on the computing device to enable a user to create file system images. The file system imaging application 110 can provide a user interface and/or an application programming interface (API), through which the user can request that a file system image be created that includes one or more selected files or other data entities.

According to various implementations, the file system image generator 102 includes an application programming interface (API), through which the file system imaging application 110 communicates with the image generator 102. The file system imaging application 110 can receive a request from a user or an automated system or program (e.g., an application program) to generate a file system image, such as image 112. Through the API, the file system imaging application 110 can pass the request to the file system image generator 102.

In various implementations, through the file system imaging application 110, one or more data entities, such as files 114 or directories 115 (which can include one or more other files 114 or other subdirectories 115), which are to be included in the image 112 can be specified. The file system imaging application 110 passes the specified file selection(s) to the file system image generator 102. A file system is a set of one or more files that may have some organization and attributes. The selected file(s) 114 may reside on one or more sources 104, such as local storage device(s) 104A, external storage device(s) 104B, network-based storage device(s) 104C or other storage device(s) 104D.

Files 114 selected for inclusion in the image 112 may be organized in some fashion, such as in a directory structure. Such file 114 organization can be defined in one or more sets of metadata, which can be included in the files 114. For example, metadata can specify attributes of files 114, such as their locations within the file organization or whether files are hidden or read-only. The image 112 therefore can include a copy of the selected files 114 and associated metadata.

In general, the file system image generator 102 copies data from the selected file(s) 114 from the one or more source(s) 104 to a buffer from which the destination storage device 108 reads the data. The destination storage device 108 may be sensitive to the rate at which data is provided to the destination storage device 108 from the file system image generator 102. Typically, the destination storage device 108 has an associated desired data transfer rate, which is the rate at which the destination device 108 optimally reads data from the buffer where the file system image generator 102 copies data.

If file data is transferred to the destination storage device 108 more slowly than the desired transfer rate, a buffer underrun condition may arise in which the destination storage device 108 waits for more data to be provided. Waiting for data by the destination storage device 108 can result in numerous potential disadvantages. For example, creation of the image 112 may be inefficient or time consuming. It is even possible that the image 112 is rendered unreadable if the destination storage device 108 waits for data.

The file system image generator 102, therefore, includes functionality to maintain the rate of data transfer to the destination storage device 108, even though the source devices 104 and intermediate devices 106 may vary in the rate of data transfer. The source devices 104 and intermediate devices 106 typically have different associated rates of data transfer, or throughputs. The throughputs of the storage devices can vary from device to device and/or over time for any given device, as a result of numerous factors.

The throughput, and therefore the latency, of a source device 104 or intermediate device 106 in providing data of a requested file can be affected by several factors, such as the overhead time to open the file, the time it takes the storage device to read the file, and random delays, such as central processing unit (CPU) load or communication channel congestion (e.g., in the case of a network-based source device 104C). Throughput therefore includes not only the speed of the storage device in opening and reading the file, but also the speed of intervening communication channels.

Figure 3:
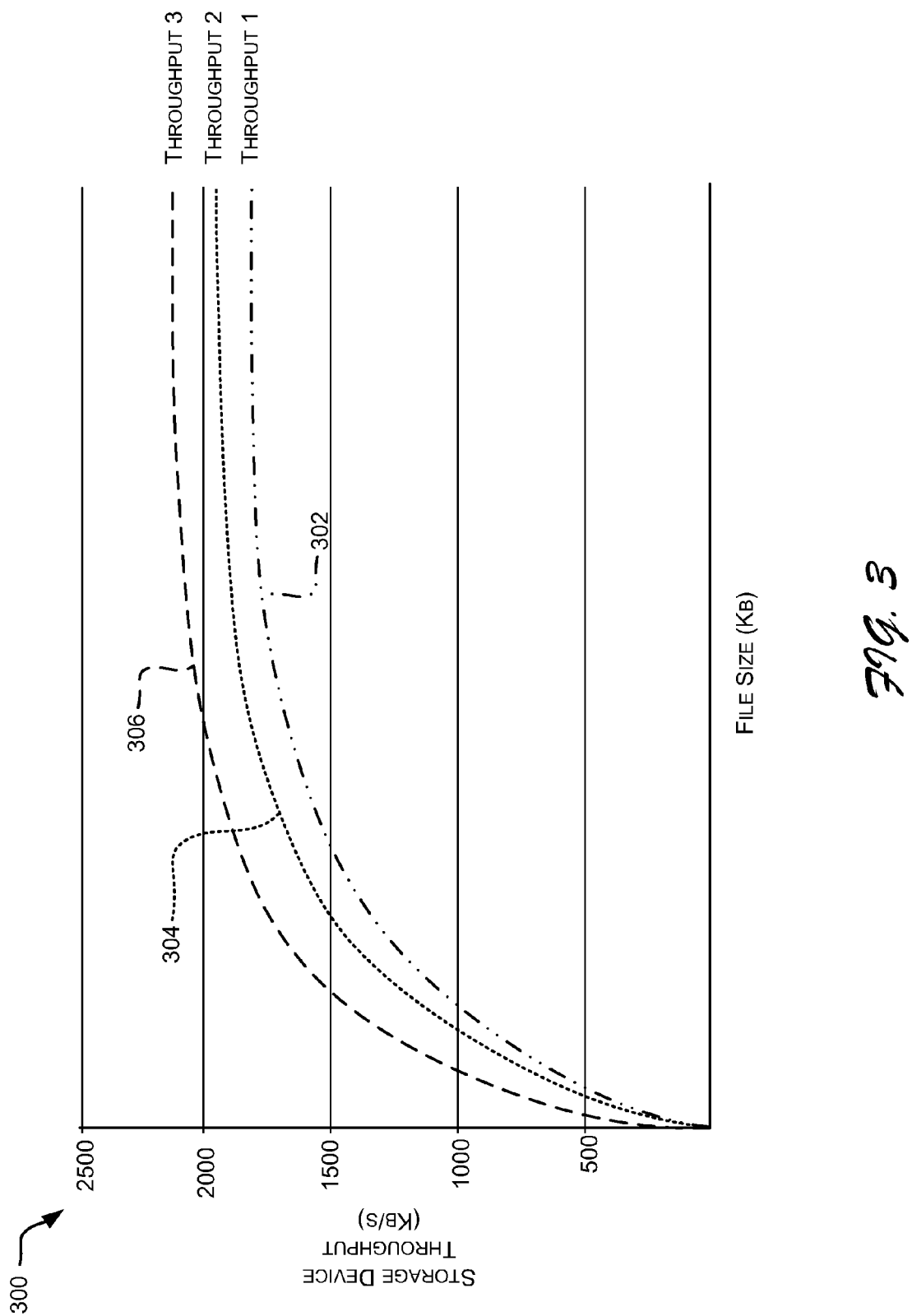
FIG. 3 is a graph illustrating example throughput profiles relating source storage device throughput to file size, which may be exhibited by source storage devices.

To illustrate, FIG. 3 is a graph 300 depicting three example storage device throughput profiles: throughput 1 (302), throughput 2 (304) and throughput 3 (306), showing file size in kilobytes (KB) along the x-axis and throughput in kilobytes/second along the y-axis. As shown, the throughput typically depends upon the file size. Typically, throughput increases asymptotically from zero to a maximum throughput as file size increases. The illustrated throughput profiles are different from each other due to random factors associated with file retrieval (e.g., differing or varying network congestion, etc.).

As a result of throughput profiles such as those shown in FIG. 3, when files are copied from their current location (e.g., a source device 104 or intermediate device 106) to the destination 108, the rate of delivery to the destination 108 can vary based on numerous factors, including file size. The rate of delivery may or may not correspond to a desired data transfer rate associated with the destination storage device 108. For any particular file of a given size, the retrieval rate from the current storage device may not be sufficient to meet the desired data transfer rate of the destination device 108.

In accordance with an implementation, intermediate devices 106 can be used to compensate for differences between data rates of source devices 104 and the destination device 108. The intermediate devices 106 provide faster data transfer than the sources 104. More specifically, the intermediate devices 106 provide data throughput that is at least as fast as a specified data transfer rate of the destination device 108. Accordingly, by using the intermediate devices 106 for temporary storage of data, the file system image generator 102 can manage the rate at which data is provided to the destination storage device 108 to more consistently achieve a desired data transfer rate.

Examples of intermediate devices 106 are a local hard drive 106A, random access memory (RAM) 106B, non-volatile memory 106C and other memory 106D. With regard to non-volatile memory 106C, in at least one implementation, non-volatile memory 106C includes Flash memory. The Flash memory can be internal or external to the computing device which is creating the file system image. For example, internal Flash memory may reside physically or logically between dynamic random access memory (DRAM) and the destination storage device 108.

According to various implementations, the file system image generator 102 selectively stashes files from the source 104 to an intermediate storage device 106 (or from an intermediate device 106 to another intermediate device 106). Stashing refers to temporarily or permanently storing data from a file in an intermediate memory or other intermediate storage device prior to communicating the data to the destination storage device 108. The file system image generator 102 determines whether to stash a given file 116 in an intermediate memory based on the size of the file and a measurement of the file-size dependent throughput associated with retrieving the file from the storage device that currently stores the file (i.e., the current storage device). Thus, the generator 102 selectively stashes files from the source 104.

In general, according to at least one implementation, to determine whether to stash files for a given source device 104, for example, the file system image generator 102 determines a lower file size threshold that corresponds to the desired data rate of transfer to the destination device 108. Any file having a size less than the determined lower file size threshold is stashed prior to being transmitted to the destination device 108. The lower file size threshold is adjusted in real time as files are transferred in order to adjust for changes in throughput and maintain a desired data transfer rate.

In some implementations, discussed in more detail below, files that have been stashed in an intermediate device 106 (e.g., in nonvolatile memory) can be later stashed in another intermediate device 106. Such a situation may arise, for example, if the throughput of the first intermediate device 106 changes for some reason (e.g., delay in reading memory or data bus congestion). In such implementations, a lower file size threshold is determined for each intermediate device 106 and files already stored in an intermediate device 106 can be moved to another intermediate device 106 if the files have sizes less than the threshold. Lower file size thresholds are discussed below in detail with respect to source storage devices 104, but it will be understood that lower file size thresholds can be usefully applied to intermediate storage devices 106 as well.

Figure 4:
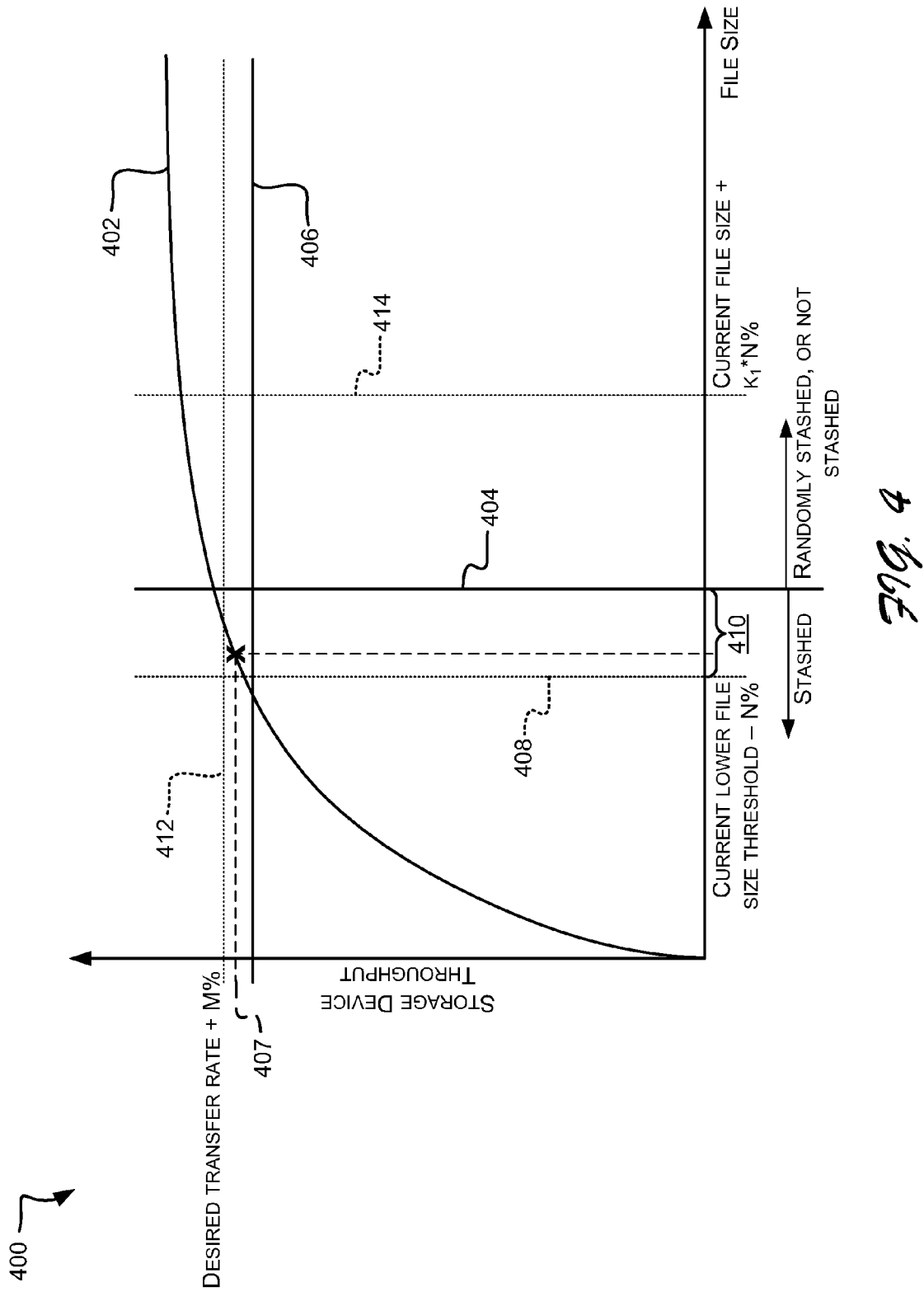
FIGS. 4-5 are graphs illustrating example throughput profiles relating source storage device throughput to file size, along with parameters used in managing lower file size threshold.

FIG. 4 is a graph 400 illustrating an example throughput profile 402 for a given storage device, which may be a source device 104 or an intermediate device 106. While a file system image is created, a lower file size threshold 404 is computed for use in determining whether each retrieved file should be stashed to achieve and/or maintain at least a desired data transfer rate 406. Files having sizes less than the current lower file size threshold 404 are stashed. A file having a size greater than or equal to the lower file size threshold 404 is not stashed, unless the file is selected for random stashing, as is discussed in detail below.

The desired data transfer rate 406 can be set according to design parameters, and may be obtained from specifications of the destination storage device 108. For example, the manufacturer of the destination storage device 108 may publish (e.g., in manufacturer's specifications) a recommended or specified transfer rate, desired read speed or similar value indicating the rate that data is read by the destination device 108. In various implementations, the desired data transfer rate 406 is used to determine or adjust the lower file size threshold. In general, throughput is tested during file stashing and communication to the destination device. Based on the measured throughput 407, the lower file size threshold may be adjusted during stashing or communication.

In one implementation, during image generation, the generator 102 measures storage device throughput for stashed files that have sizes within a tolerance region less than the current lower file size threshold. If the measured throughput 407 is not at least a determined amount greater than the desired transfer rate 406 for a given file, the lower file size threshold for the storage device is adjusted. In one implementation, the adjustment involves increasing the lower file size threshold by a selected amount, which may be a percentage of the current lower file size threshold.

To illustrate, referring to FIG. 4, assume line 408 marks a file size corresponding to the current lower file size threshold 404 minus a set value, denoted as N % of the current lower file size threshold 404. The region between line 408 and the current lower file size threshold 404 defines a tolerance region 410 of file sizes for which throughput will be tested during stashing. Another line 412 marks a throughput equal to the sum of the desired transfer rate plus a determined amount, where the determined amount is denoted as M % of the desired transfer rate 406. In this implementation, the value M % represents a safety margin, which can be used to further ensure that buffer under-runs will not occur. The value of M can be adjusted to balance the likelihood of buffer under-run with the cost of stashing files. Line 412 marks a minimum throughput, below which, the lower file size threshold is adjusted.

FIG. 4 depicts a scenario in which a stashed file identified by "x" on the profile 402 has a file size within the tolerance region 410. Because the file size is in the tolerance region 410, storage device throughput 407 is measured for the file identified by "x". In this particular scenario, the measured throughput is less than the throughput marked by minimum throughput line 412. As a result, the lower file size threshold is increased to a new file size threshold 414. In this implementation, the new file size threshold 414 is set equal to the size of the file associated with "x" plus a determined amount, denoted as $k_1$*N % of the current file size.

With regard to values $k_1$, N and M, these values are design parameters that can be set to achieve particular design goals and/or adjusted in real time to adapt performance. In one implementation, $k_1$ is 4, N % is 15% and M % is 10%, but $k_1$, N and M are not limited to these values.

Figure 5:
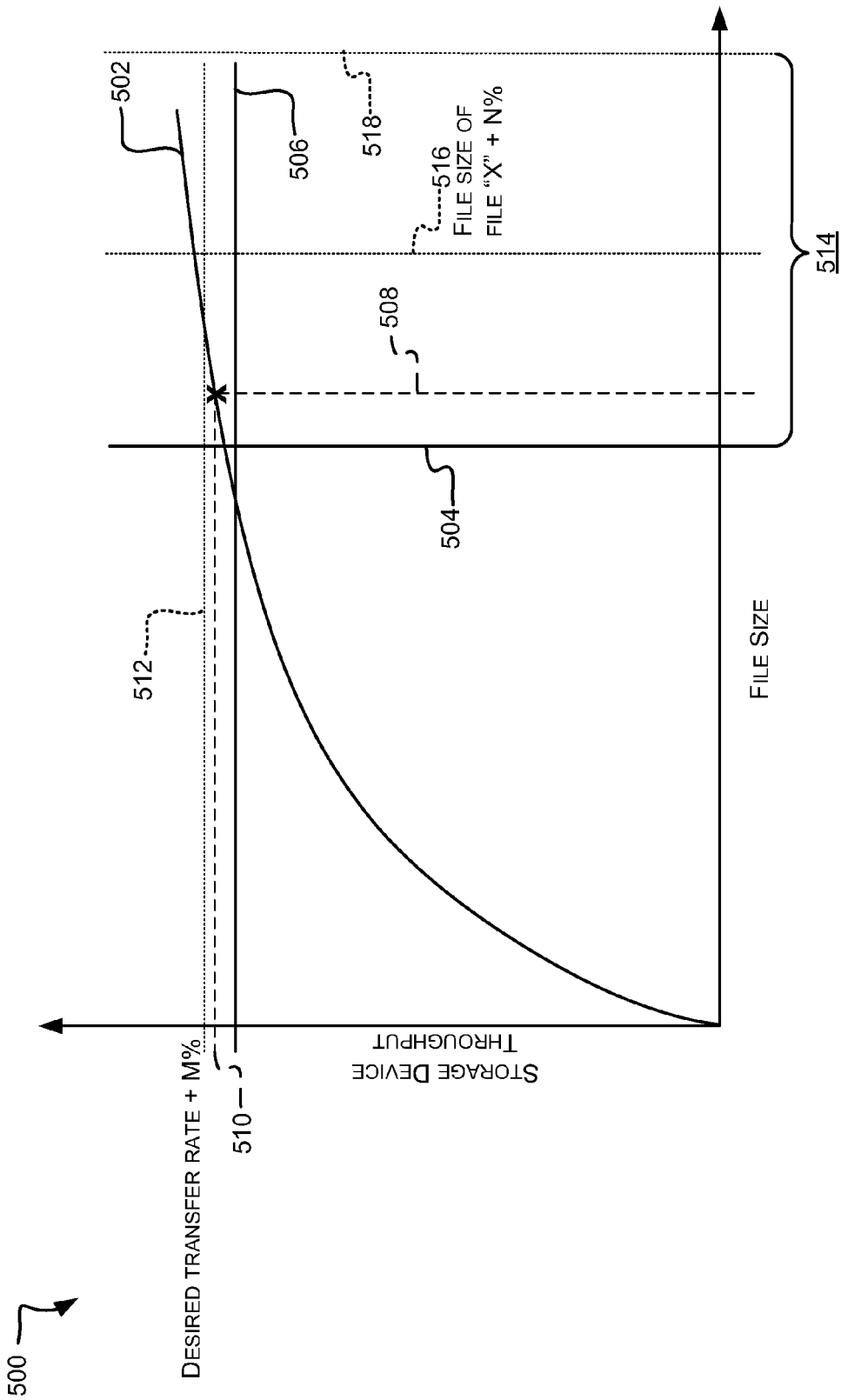

Before describing FIG. 5, some discussion is provided with respect to FIG. 4 and FIG. 5. FIG. 4 shows adjustment of the lower file size threshold during stashing of files. As is discussed in further detail below with respect to FIGS. 6-8, files are stashed, if at all, prior to communicating the files to the destination device. FIG. 5 shows adjustment of the lower file size threshold during communication of the files to the destination device, for example so that the adjustments can be applied in a future data transfer. FIG. 5 also shows how files that would otherwise not be stashed can be selected for stashing, and how the lower file size threshold can be adjusted prior to being communicated to the destination device.

FIG. 5 is a graph 500 illustrating another throughput profile 502. FIG. 5 is referenced here to demonstrate random stashing of files that would otherwise not be stashed, and testing of the lower file size threshold for files that are sent directly to the destination device 108 without stashing. The lower file size threshold is indicated by line 504 and the desired transfer rate is indicated by line 506. In the illustrated scenario, a given file identified by "x" relates to a file having a size marked by line 508. When file "x" is retrieved from the appropriate storage device, the throughput is measured to be the throughput indicated by line 510.

In the example scenario shown in FIG. 5, the measured throughput 510 for the given file "x" is less than a minimum throughput, determined by the sum of the desired transfer rate 506 plus a determined value, denoted as M % of the desired transfer rate 506. The minimum throughput in this case is marked by line 512 in FIG. 5. Because the measured throughput 510 is less than the minimum throughput 512, the lower file size threshold is adjusted. Specifically, the lower file size threshold is set equal to a new threshold 516, given by the sum of the file size 508 plus a determined amount, denoted by N % of the file size 508.

In some implementations, some files may be stashed even though their sizes are greater than the lower file size threshold 504. In such implementations, files that have sizes that fall within a test region 514 above the lower file size threshold are randomly stashed. For example, in one implementation files that have sizes greater than or equal to the lower file size threshold, but less than an upper threshold size 518 greater than the lower file size threshold 504 (i.e., files which would otherwise be communicated to the destination device without stashing) are randomly stashed. In one implementation, the upper threshold size 518 is equal to the current lower file size threshold 504 times some percentage, which is typically greater than 100%.

Random stashing of files that would otherwise not be stashed may be referred to as forced stashing. In such cases, the source throughput is checked as it normally would be during stashing and the lower file size threshold is adjusted if appropriate. Such additional stashing and checking can help ensure that the lower file size threshold is set to achieve the desired data transfer rate.

In accordance with various implementations, the lower file size threshold (e.g., 404, 504) may decrease under certain circumstances. For files that are in a certain range greater than the lower file size threshold, the throughput is measured while those files are being communicated to the destination device. The measured throughput is compared to a minimum data transfer rate. If the measured throughput is at least as great as the minimum data transfer rate at least a certain number of times, then the lower file size threshold can be reduced by some reduction value.

For example, suppose the current lower file size threshold is X. During recording of data onto the destination device, the throughput is checked for files with sizes that are within a range above X, such as files of sizes within [X; X+A %] range. If the measured throughput was above a minimum transfer rate (e.g., desired data transfer rate+B %) for a specified number (e.g. 1000) of files in that range, then the lower file size threshold, X, is reduced by C %. A counter can be used to count how many files within the range [X; X+A %], and compared to the specified number. When the counter reaches the specified number, the file size threshold is reduced.

In implementations that allow for reduction of the lower file size threshold, the file counter may be reset to 0 if the lower file size threshold is changed. For example, suppose X is 1 MB, and transfers of 500 files between 1 MB and 1 MB+A % have exhibited throughput of at least the minimum transfer rate. If X increases to 1.2 MB due to another adjustment (e.g., 718 (FIG. 7)), then the counter should be reset to zero (0). By resting the counter, 1000 files with size between 1.2 MB and 1.2 MB+A % will be counted at or above the specified minimum data transfer rate, before reducing the lower file size threshold by C %. The values X, A, C and B, as well as the specified number of files, are not limited to any particular values and can be set to any values based on design objectives.

Referring again to FIG. 1, in some implementations, for a given file and desired data transfer rate, the file system image generator 102 selects an intermediate device 106 from multiple intermediate devices 106. The selection of the intermediate device 106 to be used for stashing can be based on a determination of a lower file size threshold for each intermediate device 106 and comparison of the current file size to the threshold, for example, in the manner discussed above with regard to the source storage devices 104.

In accordance with various implementations, the lower file size thresholds are stored in association with corresponding storage devices, for example in one or more data structures. The storage device thresholds and data for use in assembling the file system image can be stored in the file system image management data 118. In some implementations, the file system image management data 118 is stored in persistent memory, such as nonvolatile memory. An example of file system image management data 118 is shown in FIG. 2.

The example implementation of the file system imaging management data 118 shown in FIG. 2 includes storage device lower file size threshold table 202 and file system imaging assembly data 204. Storage device lower file size threshold table 202 maintains associations between identifiers 206 of storage devices, desired transfer rates 208 and associated lower files size thresholds 210. The storage device identifiers 206 may identify source storage devices 104 or intermediate storage devices 106.

In one implementation, the lower files size threshold table 202 is maintained in persistent memory, such as the operating system registry or Flash memory, so that the lower file size threshold for each storage device is available for use from one image generation process to another. Because a destination device may support multiple speeds and a source device in example implementations can supply or feed data to multiple destination devices, desired transfer rates 208 are stored in association with the storage device identifiers 206 and lower file size thresholds 210. For example a destination device may support a number of discrete speeds, such as 2x, 4x, or others.

In the illustrated implementation, for a given storage device, multiple thresholds may be determined for multiple desired transfer rates. Therefore, table 202 may include multiple rows for a given storage device to associate multiple storage device/desired transfer rate pairs with corresponding determined lower file size thresholds. For example, in the scenario of FIG. 2, three thresholds (threshold 4, threshold 5 and threshold 6) have been determined for storage device 3. Each of the three thresholds corresponds to a different desired transfer rate (desired transfer rate 3, desired transfer rate 4 and desired transfer rate 5) associated with storage device 3.

Initially, before any file system images are created, the lower file size thresholds 210 may be set to default values. At the beginning of each image generation, the appropriate threshold is read from the table 202, depending on which storage device currently stores the file(s) to be imaged and the desired transfer rate. The thresholds 210 may be updated during each image generation process as the thresholds change.

For example, threshold 1 may be initially set to a default value of 550 KiloBytes (KB). While generating a first image that includes files from storage device 1, the threshold 1 might be determined to be 1000 KB. Threshold 1 is updated to be equal to 1000 KB. When a second image is created later, the 1000 KB threshold is read from table 202 and used to create the second image. While creating the second image, due to changes in throughput of storage device 1 or other factors, the threshold may change to 1500 KB. In this case, the threshold 1 is updated with the new file size threshold of 1500 KB.

The example file system image assembly data 204 maintains associations between identifiers (e.g., file names, uniform resource locators (URLs), etc.) 212 of files to be included in an image and identifiers of the current storage locations 214 of those files. The identified locations 214 in the assembly data 204 identify at least the storage device, but may also identify a memory location on the appropriate storage device, as well other information used during image assembly or communication to a destination device. The current storage locations 214 may identify source storage devices or intermediate storage devices, depending on where the files 212 are currently located.

In one implementation, the locations 214 are initially set with default values, such as the source storage locations where the identified files 212 are stored. During the image generation process, one or more of the files 212 may be stashed in an alternate memory, such as an intermediate storage device. The locations associated with those one or more files are updated to identify the intermediate storage device locations. In some implementations, the file system image assembly data 204 is stored in persistent memory, where it can be carried over and used from one image generation process to the next.

Figure 7:
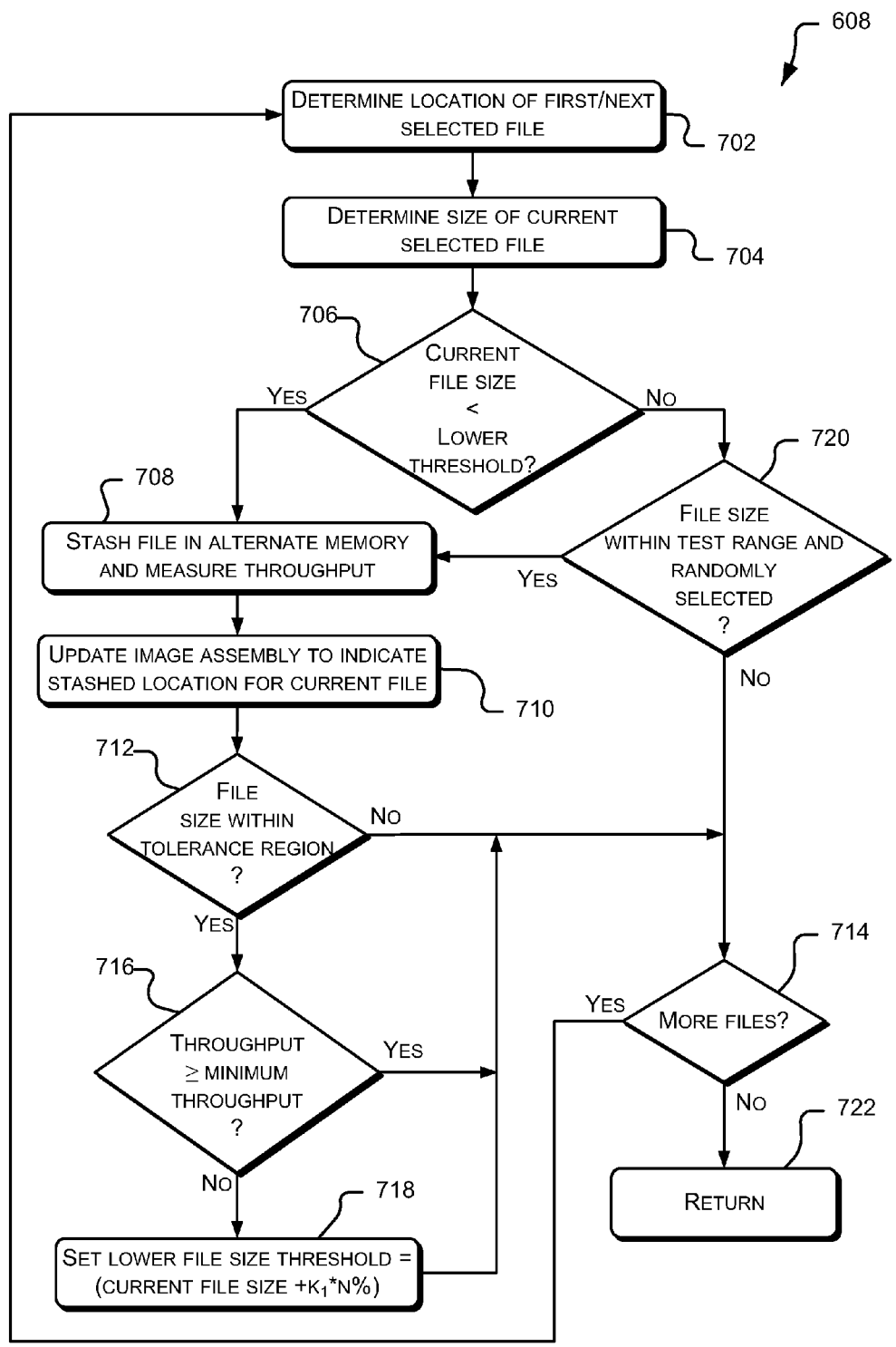
Figure 8:
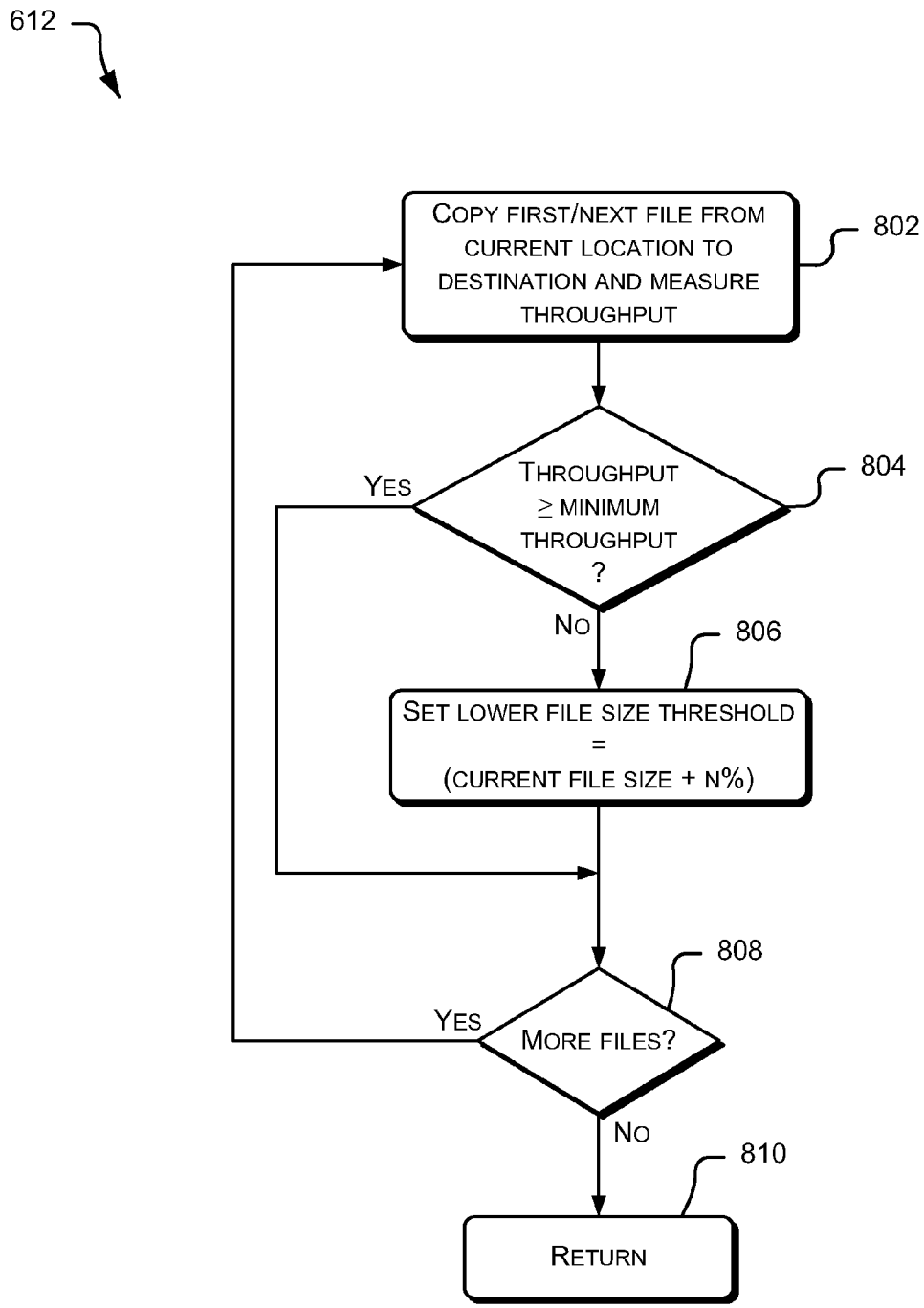

During the image assembly process, the storage locations 214 are set and/or changed. During the image communication process, the storage locations 214 are used to locate the files to be included in the image. An example image assembly process that can use and update file system image assembly data 204 is shown in FIG. 7 and discussed below. An example file communication process that can use the file system image assembly data 204 to locate files is shown in FIG. 8 and discussed below.

The image assembly data 204 may span more than just the previous assembly. Depending on the amount of space available on intermediate storage devices, stashed copies do not necessarily need to be deleted after each image generation. To keep track of previously stashed files, the image assembly data 204 may also include one or more last access times 216. A last access time 216 can be associated with each of the identified files 212 and updated each time the identified file is stashed or the stashed copy is used. The oldest entry or entries (i.e., the least recently accessed file or files) in the image assembly data 204, and the file(s) associated with the entry or entries, can be removed to free memory.

Although the implementation shown in FIG. 1 relates to the storage of an image 112 on a destination storage device 108, concepts described herein can also be applied in cases where the destination device is not a storage device, and in cases that have nothing to do with image creation. For example, stashing of files could be used when the destination device is a video or audio player that plays back content. As another example, the destination device may be a printer. In such cases, and others, the destination device may be sensitive to the rate at which data is communicated to, or read by, the destination device. Accordingly, data may be stashed in intermediate storage/memory as discussed herein to achieve a desired data transfer rate, even when the destination device is not a storage device.

Figure 6:
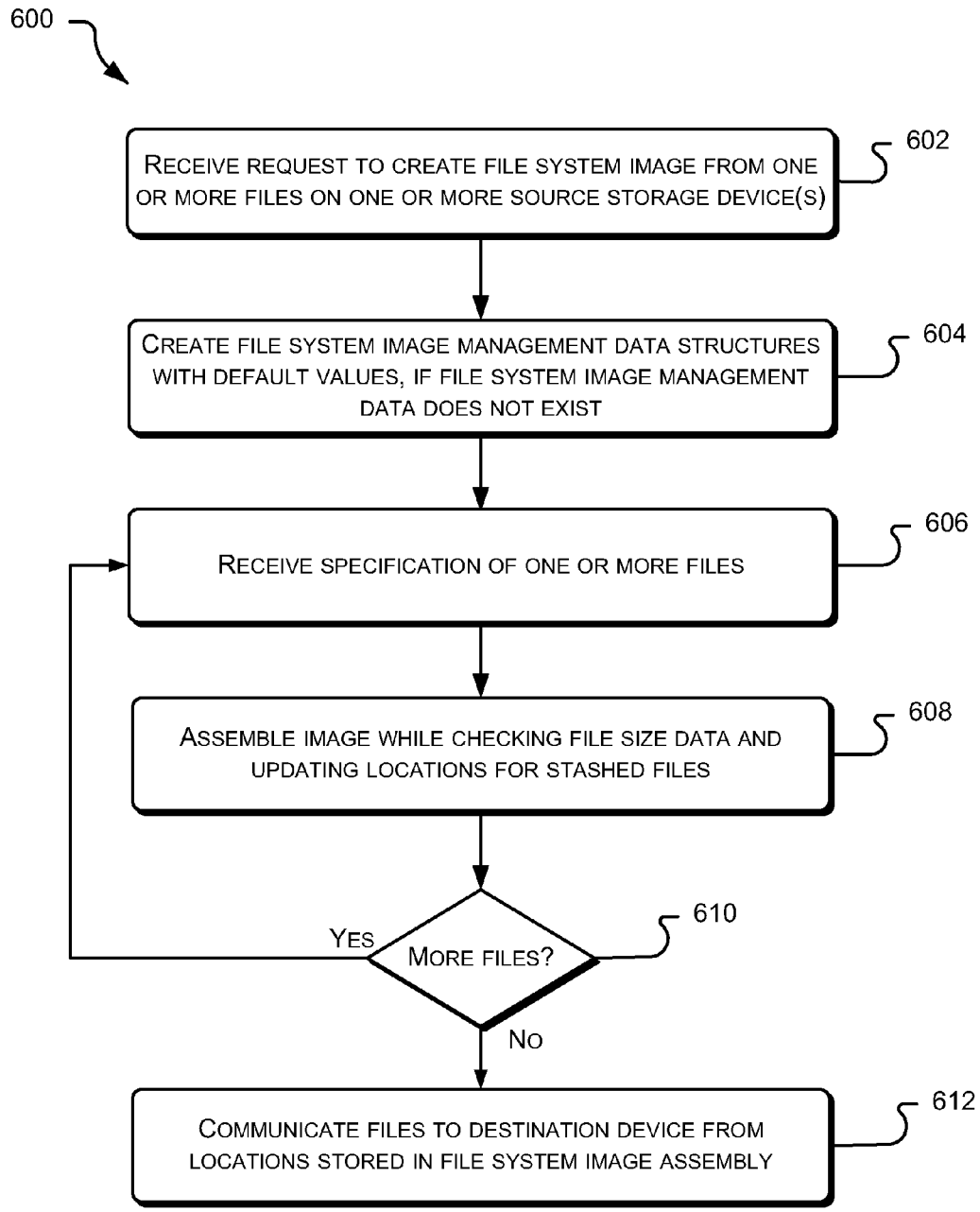
FIGS. 6-8 are flow charts illustrating example processes for copy a file system to a destination storage device.

FIG. 6 is a flow chart illustrating an example image request handling operation 600 for handling a request to generate a file system image. Initially an imaging request is received in receiving operation 602. The request may be received by an operating system image generator (e.g., file system image generator 102 (FIG. 1)) from a file system imaging application (e.g., file system imaging application 110 (FIG. 1)), which receives input from a user or automated system (e.g., an application program) indicating the initiation of a file system image creation process.

A creating operation 604 creates a set of file system imaging management data (e.g., file system image assembly data 118 (FIG. 2)) for use in constructing and communicating the image to a destination device, if no file system imaging management data has been created yet. In general, if file system imaging management data 118 exists from a previous image generation process, the existing file system imaging management data 118 can be used and updated during the process of creating the next file system image.

If no file system imaging management data 118 exists, the creating operation 604 creates a new set of file system imaging management data 118. In this case, creating operation 604 involves creating data structures, such as storage device lower file size threshold table 202 and file system image assembly data 204, with one or more blank entries. As is discussed below with regard to assembling operation 608, the blank entries are filled in, and new entries are added, as the user or application program specifies files to be included in the file system image.

In a receiving operation 606, one or more file specifications are received, which specify a file or files to be included in the image. The receiving operation may receive a file name or other identifier identifying a selected file. Alternatively, the receiving operation 606 may receive a directory or directory tree name or other identifier. When a directory or directory tree identifier is received, this generally indicates that the files with the specified directory and subdirectories are to be included. As such, numerous files can be specified by way of a directory or directory tree specification.

In an assembling operation 608, a file system image is assembled to include one or more selected files. In an implementation of the assembling operation 608, the one or more files specified in receiving operation 606 are identified and their locations updated and/or registered (e.g., in file system image assembly data 204 (FIG. 2)). Subsequently, the communicating operation 612 can use the registered file locations to locate and transfer the files to the destination.

In an implementation of the assembling operation 608, it is determined whether the selected file or files should be stashed based on file size and a lower file size threshold. During image assembling operation 608, file locations (e.g., file locations 214 (FIG. 2)) may be updated in the file system image assembly data 204 for any files whose locations change, for example, as a result of stashing. An example assembling operation 608 is shown in FIG. 7 and discussed below.

A querying operation 610 determines whether at least one more file is specified for inclusion. Querying operation 610 may check whether a user or automated system has specified another file or files to be included. If at least one more file is specified, handling operation 600 branches "YES" to receiving operation 606, where an identifier of the one or more files is received. If no more files are specified, handling operation 600 branches "NO" to a communicating operation 612. Accordingly, in this implementation, all the specified files are assembled and stashed, if appropriate, prior to transferring them to the destination device.

In a communicating operation 612, files to be included in the image are communicated to the destination device. In an implementation of the communicating operation 612, file system image assembly data 204 can be used to locate the files to be copied. During the communicating operation 612, one or more lower file size thresholds (e.g., lower file size thresholds 210 (FIG. 2)) may be updated, depending on the throughput of the storage device(s) during data transfer. An example communicating operation 612 is shown in FIG. 8 and discussed below.

FIG. 7 is a flow chart illustrating an example file system image assembly process 608 for assembling files for inclusion in a file system image. It is assumed that a request to create a file system image has been received, such as in the file system imaging request handling process of FIG. 6. It is also assumed that one or more files have been specified for inclusion. In general, if one file has been specified, the operation 608 iterates once, and if multiple files have been specified (e.g., if a directory of files was specified), the operation 608 repeats until the multiple files have been assembled.

A determining operation 702 determines a selected file's current location. In one implementation of the determining operation 702, the current location of the selected file is determined by searching a data structure, such as file system image assembly data 204 (FIG. 2). If the selected file is identified in the data file system image assembly data 204, the associated current location is obtained from the set of current locations 214.

If, in the determining operation 702, the selected file is not found in the file system image assembly data 204, the current location can be determined using standard file locating systems, such as the OS file system (for local files) or a domain name system (DNS) look-up with a URI (for network-based files). The determining operation 702 then adds the new file, along with the file's location, to the file system image assembly data 204.

In another determining operation 704, the size of the first selected file (the current file for purposes of this iteration) is determined. In one implementation, the name or other identifier of the current file may be obtained from the file system image assembly data 204. The storage device where the current file is currently located is also determined, for example by reading the current storage location 214 from the file image assembly data 204. In an implementation of determining operation 704 metadata about the selected file is read to determine the file size. Determining operation 704 may query the current storage device that contains the file to determine the file size.

In a querying operation 706 it is determined whether the file size of the current file is less than the lower file size threshold associated with the current storage device and desired transfer rate. In one implementation of the querying operation 706, the lower file size threshold associated with the current storage device and desired transfer rate is read from a data structure, such as lower file size threshold data structure 202 (FIG. 2). The file size determined in operation 704 is compared to the lower file size threshold associated with the current storage device and desired transfer rate.

If, in querying operation 706, it is determined that the file size is less than the lower file size threshold, the assembling operation 608 branches "YES" to stashing operation 708. Stashing operation 708 copies the current file to an intermediate storage device. During the copying of the file from the current storage device to the intermediate storage device, the throughput of the current storage device is measured. As discussed above, the intermediate storage device used for stashing may be an intermediate storage device that is generally capable of providing a throughput greater than throughput associated with the current storage device.

In an implementation of the stashing operation 708, the intermediate storage device is selected from multiple intermediate storage devices, which have different speed or latency characteristics. The intermediate storage device may be selected based on a determined throughput based on file size. For example, stashing operation 708 may compare the current file size with the lower file size threshold associated with each intermediate storage device and the desired transfer rate, such as thresholds in the data structure 202 (FIG. 2).

An implementation of the stashing operation 708 may choose one of the intermediate storage devices based on the difference between the current file size and the intermediate device threshold and the sensitivity of the destination device to data buffer under-run conditions. If the destination device is more sensitive, the stashing operation 708 may choose an intermediate storage device having a lower associated lower file size threshold. If the destination device is less sensitive, the stashing operation 708 may choose an intermediate storage device having a higher associated lower file size threshold.

In another implementation of the stashing operation 708, the intermediate storage device is selected based on the amount of memory available on the intermediate storage devices. For example, an intermediate storage device may be selected over another intermediate storage device that has less memory available for stashing.

In yet another implementation of the stashing operation 708, selection of an intermediate storage device may be based on a predefined ranking of intermediate storage devices. The predefined ranking may reflect each intermediate storage device's relative value. For example, on-board Flash memory may be more valuable than a local hard drive, because the amount of such memory is typically much smaller than the amount of space on a local hard drive. Flash memory may also provide higher performance and may be utilized, for example, to cache other data that may be more important.

In an updating operation 710, the location of the current file is updated in the file system image assembly data 204 (FIG. 2). In an implementation of the updating operation 710, an identifier for the intermediate memory location 214 is stored in association with the identifier (e.g., name) of the current file 212 in the file system image assembly data 204. For example, the intermediate memory location identifier 214 may identify a selected intermediate storage device, as well as the memory address on the selected intermediate storage device.

In another querying operation 712 it is determined whether the file size of the current file is within a tolerance region (e.g., region 410 (FIG. 4)) less than the lower file size threshold of the current storage device from which the current file was retrieved in the stashing operation 708. In the illustrated implementation, the tolerance region is defined by the lower file size threshold and a lesser value such as the lower file size threshold minus a tolerance factor, such as N % of the lower file size threshold.

If the file size is not within the tolerance region 410, the operation 608 branches "NO" to another querying operation 714, which checks whether another file has been specified.

On the other hand, if in querying operation 712 it is determined that the file size is within the tolerance region, the operation 608 branches "YES" to another querying operation 716. In querying operation 716, it is determined whether the throughput of the current storage device measured in stashing operation 708 is at least as great as a minimum throughput, such as the desired data transfer rate plus a safety margin (e.g., M %). In the illustrated implementation, querying operation 716 determines whether the measured throughput is greater than or equal to the desired data transfer rate plus another tolerance factor, such as M % of the desired data transfer rate.

If in querying operation 716 it is determined that the measured throughput of the current storage device is at least as great as the minimum throughput, the operation 608 branches "YES" to querying operation 714, which checks whether another file has been specified.

On the other hand, if in querying operation 716 it is determined that the measured throughput of the current storage device is less than the minimum throughput, the operation 608 branches "NO" to a setting operation 718. In setting operation 718, the lower file size threshold associated with the current storage device (i.e., the device from which the current file was copied in stashing operation 708) and the desired transfer rate is set. In this particular implementation, the lower file size threshold is increased by setting the lower file size threshold equal to the size of the current file plus another tolerance factor, denoted by "$k_1*N$ %" (N % of the size of the current file) in FIG. 7.

The values N, M and $k_1$ may be set as design parameters to meet one or more performance objectives. In one particular implementation, N=15%, M=10% and $k_1$=4. It should be understood that N, M and $k_1$ are not limited to these particular values, but rather, they may be set to any respective values as may be suitable to the particular implementation. For example, in other implementations, N is 20%, M is 15% and $k_1$ is 5. Furthermore, one or more of N, M and $k_1$ may be automatically or manually adjusted in response to real-time observations. For example, if buffer under-runs occur despite the processes described herein, M may be increased to thereby increase the safety margin. As another example, N may be decreased to reduce the size of the tolerance region 410 to thereby perform the throughput check in querying operation 716 less and free up processing time.

After the lower file size threshold is set in setting operation 718, the operation 608 branches to querying operation 714, which checks whether another file has been specified. Returning to querying operation 706, if it is determined that the current file size is not less than the lower file size threshold, the operation 608 branches "NO" to another querying operation 720.

In querying operation 720 it is determined whether the current file size is within a test range (e.g., test range 514 (FIG. 5)) greater than or equal to the lower file size threshold and whether the current file is selected for stashing. In a particular implementation, it is checked whether the current file size is between the lower file size threshold of the current storage device and some amount, $k_2$, times the lower file size threshold. If the file size is between the lower file size threshold and $k_2$ times the lower file size threshold, the current file has a probability "P" of being selected. If the current file is selected, the assembling operation 608 branches "YES" to the stashing operation 708.

To further illustrate, in an implementation of the querying operation 720, if the current file size is within a range bounded by the lower file size threshold and a predetermined amount (e.g., $k_2$) times the lower file size threshold, there is only a chance, P, that the operation 608 will branch "YES" to stashing operation 708. The value of $k_2$ may be virtually any value, depending on the implementation. In some implementations, the value of $k_2$ is typically between 1 and 5, and may or may not be an integer. By branching "YES" with probability P, the stashing operation 708, querying operation 712, querying operation 716 and setting operation 718 may occur randomly in some cases where stashing and associated threshold and throughput testing and adjustment would not otherwise occur.

Probability P is typically selected to ensure that at least some of the files that would otherwise not be stashed before being communicated to the destination storage device are stashed. For example, in some implementations, P may be set to 20%, so that on average one in five files which would not otherwise have been stashed will be stashed. P may be set to virtually any value between zero and 100%, depending on the particular implementation. By randomly stashing files that have sizes within the test range, the lower file size threshold can be further verified in cases where it would not otherwise be verified.

In another implementation of the querying operation 720, every "$n^{th}$" file having a size within the test range 514 is selected. In this implementation, the value "n" could be any number, depending on design goals. For example, "n" may be 5, 10, 20, or some other number. Further, "n" may be set and/or adjusted based on real-time observations. For example, if "n" is initially set to 20, but during the file transfer process, it is determined that under-run conditions still occur, "n" may be reduced to cause more files to be stashed.

If, on the other hand, it is determined in querying operation 720 that the current file size is not within the test range or the current file is not randomly selected, the operation 608 branches "NO" to querying operation 714, which checks whether another file has been specified. If in querying operation 714, it is determined that at least one more file has been specified, the operation 608 branches back to determining operation 702.

Operation 608 continues to loop until the specified files have been assembled, iterating through each file to be included in the file system image. If the querying operation 714 determines that all the specified files have been assembled, the assembling operation 608 branches "NO" to returning operation 722, which returns to operation 600 (FIG. 6).

In an alternative implementation of the assembling operation 608, the decision whether to stash the selected file(s) is made after all the selected files and/or directory trees have been specified. For example, as a user selects each file or directory tree to be included, associated identifier(s) of the selected file(s) can be stored in memory, for example, in file system image assembly data 204 (FIG. 2). After the file(s) have been specified and entered into the file system image assembly data 204, the assembly operation 608 can iteratively step through the entries and determine whether each specified file should be stashed.

FIG. 8 is a flowchart illustrating file communication process 612, in which one or more files are communicated to a destination device. In one implementation, one or more files identified in the assembling operation 608, are iteratively located and copied to a memory accessible by a destination device, such as a destination storage device. In a copying operation 802, an identified file is copied to the destination memory.

In a particular implementation, the current location of the file to be copied is determined by reading the current location data 214 of the file image assembly data 204 (FIG. 2). Of course, the current location may be a source location (e.g., source storage device 104 (FIG. 1)) or an intermediate location (e.g., intermediate storage device 106 (FIG. 1)). In copying operation 802, the throughput of the current storage device is measured during copying from the current storage device to the destination storage device.

In a querying operation 804 it is determined whether the measured throughput of the current storage device is at least as great as some minimum throughput. In one implementation, querying operation 804 determines whether the measured throughput is greater than or equal to a desired data transfer rate associated with the destination device plus some tolerance. In the particular implementation shown, it is determined whether the measured throughput is greater than or equal to the desired transfer rate plus M % of the desired transfer rate.

If, in querying operation 804, the measured throughput is determined to be greater than or equal to the desired transfer rate plus the tolerance, the operation 612 branches "YES" to another querying operation 808, which checks whether another file is to be communicated to the destination memory.

If, on the other hand, it is determined in querying operation 804 that the measured throughput is not at least as great as the minimum throughput (e.g., the desired data transfer rate plus a safety margin), the operation 612 branches "NO" to a setting operation 806. In the particular implementation shown, setting operation 806 adjusts the lower file size threshold of the current storage device by setting it equal to the current file size (the file size of the file copied in copying operation 802) plus N % of the current file size.

In one implementation, the setting operation 806 saves the change to the lower file size threshold in the storage device lower file size threshold table 202 (FIG. 2). For example, the new lower file size threshold can be saved in a set of threshold values 210 in association with the corresponding current storage device and desired transfer rate.

After adjusting the lower file size threshold in setting operation 806, the operation 612 branches to querying operation 808. Querying operation 808 determines whether at least one more file is to be communicated to the destination memory. If so, communicating operation 612 branches "YES" to the copying operation 802 where the next file is copied from the next file's storage device to the destination memory. If querying operation 808 determines that all files have been copied, communicating operation 612 branches to returning operation 810, which returns to the handling operation 600 shown in FIG. 6.

It will be appreciated that the operations shown in FIGS. 6-8 are merely one illustrative implementation and numerous changes may be made, depending on the design. For example, the order of operations shown in FIGS. 6-8 may be changed to suit any particular design. In addition, operations shown in one or more of FIGS. 6-8 may be logically included in other operations and/or combined to suit a particular design.

Figure 9:
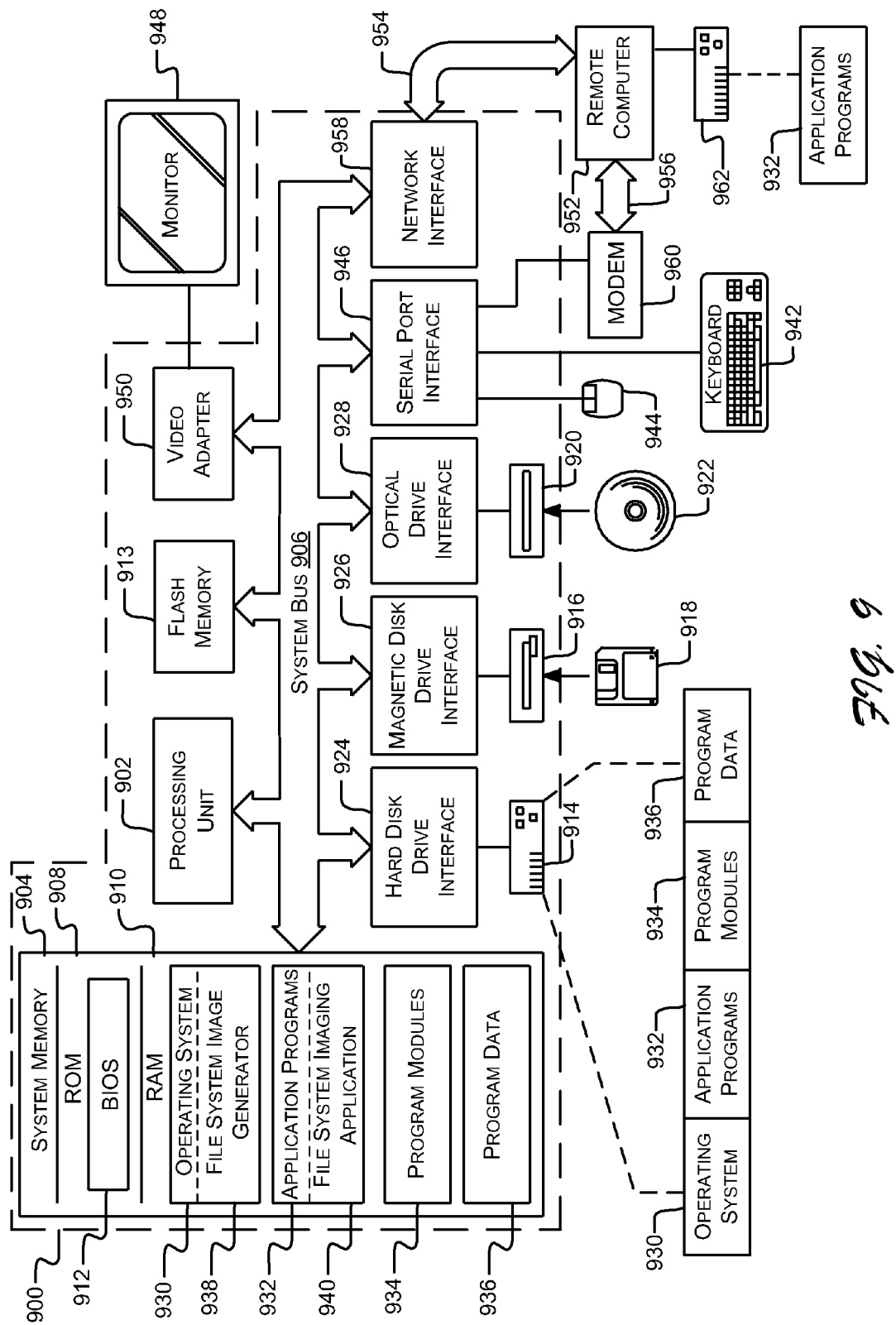
FIG. 9 illustrates a suitable computing environment for implementing the systems and processes described herein.

With reference to FIG. 9, an exemplary system for implementing the operations described herein includes a general-purpose computing device in the form of a conventional personal computer 900, including a processing unit 902, a system memory 904, and a system bus 906. System bus 906 links together various system components including system memory 904 and processing unit 902. The processing unit 902 can include one or more processors, for example microprocessors or multiprocessors.

System bus 906 may be any of several types of bus structures including a memory bus or memory controller, a peripheral bus, and a local bus using any of a variety of bus architectures. System memory 904 includes read only memory (ROM) 908 and random access memory (RAM) 910. A basic input/output system 912 (BIOS), containing the basic routine that helps to transfer information between elements within the personal computer 900, such as during start-up, is stored in ROM 908.

As discussed above, in various implementations, the personal computer 900 can include internal Flash memory 913, which can be used as intermediate memory. Flash memory 913 may have a faster throughput than other types of memory. In this regard, Flash memory 913 can be used to stash files or other data, prior to communicating the data to another destination device. Because Flash memory 913 is nonvolatile, files may be stashed in Flash memory 913 on long term basis, such as semi-permanently.

As depicted, the example personal computer 900 further includes a hard disk drive 914 for reading from and writing to a hard disk (not shown), a magnetic disk drive 916 for reading from or writing to a removable magnetic disk 918, and an optical disc drive 920 for reading from or writing to a removable optical disc 922 such as a CD ROM, DVD, Blu-Ray™, or other like optical media.

As discussed above, optical disc drive 920 is one possible storage device that can be used to store a file system image that includes from other storage media accessible to the computer 900. Because optical disc drive 920 may be sensitive to the rate of data transfer, selective stashing processes discussed above may be used to provide a desired rate of data transfer to the optical disc drive 920. However, it will be understood that the systems and processes described herein can be implemented even if the destination storage device is not sensitive to the rate of data transfer.

Hard disk drive 914, magnetic disk drive 916, and optical disc drive 920 are connected to the system bus 906 by a hard disk drive interface 924, a magnetic disk drive interface 926, and an optical drive interface 928, respectively. These exemplary drives and their associated computer readable storage media provide nonvolatile storage of computer readable instructions, data structures, computer programs and other data for the personal computer 900.

Although the exemplary environment described herein employs a hard disk, a removable magnetic disk 918 and a removable optical disc 922, it should be appreciated by those skilled in the art that other types of computer readable storage media which can store data that is accessible by a computer, such as magnetic cassettes, flash memory cards, digital video discs, random access memories (RAMs), read only memories (ROMs), and the like, may also be used in the exemplary operating environment.

A number of computer programs may be stored on the hard disk, magnetic disk 918, optical disc 922, ROM 908 or RAM 910, including an operating system 930, one or more application programs 932, other programs 934, and program data 936. As discussed above, operating system 930 may include a file system image generation program 938 that includes executable instructions for implementing the selective stashing systems and carrying out the processes described in FIGS. 1-8 when executed by one or more processors. Application programs 932 may include a file system image application 940 that provides a user interface and interacts with the file system image generator 938 to enable a user to generate a file system image.

A user may enter commands and information into the personal computer 900 through input devices such as a keyboard 942 and pointing device 944 (such as a mouse). Other input devices (not shown) may include a microphone, joystick, game pad, satellite dish, scanner, or the like. These and other input devices are often connected to the processing unit 902 through a serial port interface 946 that is coupled to the system bus, but may be connected by other interfaces, such as a parallel port, game port, a universal serial bus (USB), etc.

A monitor 948 or other type of display device is also connected to the system bus 906 via an interface, such as a video adapter 950. In addition to the monitor, personal computers typically include other peripheral output devices (not shown), such as speakers and printers.

Personal computer 900 may operate in a networked environment using logical connections to one or more remote computers, such as a remote computer 952. Remote computer 952 may be another personal computer, a server, a router, a network PC, a peer device or other common network node, and typically includes many or all of the elements described above relative to the personal computer 900.

The logical connections depicted in FIG. 9 include a local area network (LAN) 954 and a wide area network (WAN) 956. Such networking environments are commonplace in offices, enterprise-wide computer networks, Intranets and the Internet.

When used in a LAN networking environment, personal computer 900 is connected to local network 954 through a network interface or adapter 958. When used in a WAN networking environment, the personal computer 900 typically includes a modem 960 or other means for establishing communications over the wide area network 956, such as the Internet. Modem 960, which may be internal or external, is connected to system bus 906 via the serial port interface 946.

In a networked environment, computer programs depicted relative to personal computer 900, or portions thereof, may be stored in a remote memory storage device 962. It will be appreciated that the network connections shown are exemplary and other means of establishing a communications link between the computers may be used.

Some or all of the example technology described herein can be variously implemented via computer-executable instructions, such as program modules, which are stored and/or executed by one or more computers (or processors within them) or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media", "storage media", "storage", and the like include volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein. For example, principles and technologies disclosed herein can be applied not only to copying a disc image onto a storage medium such as one or more CDs or DVDs, but to copying or transferring any set or lesser subset of data from a source device to a destination device directly and/or or through one or more intermediate storage devices. There can be multiple layers of storage devices, and an intermediate storage device can function as a source device with respect to another intermediate storage device, in a process or system for transferring data to a destination device. For example, principles and technologies disclosed herein can be applied in "on-demand" transfer of music, video, or other multimedia, or other data, to one or more destination devices where timing is an issue. For example, in situations where transfer of data needs to occur at or above a minimum continuous rate and/or at or above an overall rate, and/or by a particular time deadline, principles and technologies disclosed herein can be applied. The data to be transferred can be contiguous or monolithic, or can be a set of separate groups of data, which can (but need not necessarily) be related or linked with each other in a hierarchical or other fashion.

Although the subject matter has been described in language specific to structural features and/or methodological acts, it is to be understood that the subject matter defined in the appended claims is not necessarily limited to the specific features or acts describe above. Rather, the specific features and acts described above are disclosed as example forms of implementing the claims.

What is claimed is:

1. A method for selectively stashing files, comprising:
   determining a first data transfer rate for a source device;
   determining a second data transfer rate for an intermediate storage device;
   defining a file size threshold for selectively stashing a file from the source device to the intermediate storage device for transmission of the file from the intermediate storage device to a destination device, based upon at least one of the first data transfer rate or the second data transfer rate;
   responsive to a size of the file being below the file size threshold, stashing the file within the intermediate storage device;
   responsive to the size of the file being above the file size threshold, sending, without stashing the file within the intermediate storage device, the file to the destination device; and
   updating the file size threshold based upon at least one of:
      a first measured throughput associated with sending the file to the destination device; or
      a second measured throughput associated with stashing the file within the intermediate storage device, at least some of the method implemented at least in part via a processing unit.

2. The method of claim 1, the stashing the file comprising: stashing the file in at least one of a temporary or permanent manner.

3. The method of claim 1, the destination device comprising an optical storage device.

4. The method of claim 1, the intermediate storage device comprising a hard drive.

5. The method of claim 1, comprising randomly stashing a second file, having a second file size greater than the file size threshold, from the source device to the intermediate storage device based upon the second file size falling within a test size region greater than the file size threshold.

6. The method of claim 1, the file size threshold based at least in part on at least one of a safety margin, tolerance value, throughput value, or a desired data transfer rate.

7. The method of claim 1, comprising creating a file size threshold table for at least one of different devices or different users.

8. The method of claim 5, comprising:
   updating the file size threshold based upon a third measured throughput associated with randomly stashing the second file within the intermediate storage device.

9. The method of claim 1, comprising:
   stashing the file from the intermediate storage device to a second intermediate storage device for transmission of the file from the second intermediate storage device to the destination device.

10. The method of claim 1, comprising:
    assembling a file system image comprising the file; and
    communicating the file system image to the destination device.

11. A system for selectively stashing files, comprising:
    a component configured to:
       determine a first data transfer rate for a source device; and
       determine a second data transfer rate for an intermediate storage device; and
    a file system image generator configured to:
       define a file size threshold for selectively stashing a file from the source device to the intermediate storage device for transmission of the file from the intermediate storage device to a destination device, based upon at least one of the first data transfer rate or the second data transfer rate;
       responsive to a size of the file being below the file size threshold, stash the file within the intermediate storage device;
       responsive to the size of the file being above the file size threshold, send, without stashing the file within the intermediate storage device, the file to the destination device; and
       update the file size threshold based upon at least one of:
          a first measured throughput associated with sending the file to the destination device; or
          a second measured throughput associated with stashing the file within the intermediate storage device, at least some of at least one of the component or the file system image generator implemented at least in part via a processing unit.

12. The system of claim 11, the destination device comprising an optical storage device.

13. The system of claim 11, the file system image generator configured to randomly stash a second file, having a second file size greater than the file size threshold, from the source device to the intermediate storage device based upon the second file size falling within a test size region greater than the file size threshold.

14. The system of claim 11, the file size threshold based at least in part on at least one of a safety margin, tolerance value, throughput value, or a desired data transfer rate.

15. The system of claim 11, the intermediate storage device comprising a hard drive.

16. The system of claim 13, the file system image generator configured to update the file size threshold based upon a third measured throughput associated with randomly stashing the second file within the intermediate storage device.

17. A computer-readable storage medium comprising computer-executable instructions, which when executed at least in part via a processing unit on a computer perform acts, comprising:
    determining a first data transfer rate for a source device;
    determining a second data transfer rate for an intermediate storage device;
    defining a file size threshold for selectively stashing a file from the source device to the intermediate storage device for transmission of the file from the intermediate storage device to a destination device, based upon at least one of the first data transfer rate or the second data transfer rate;
    responsive to a size of the file being below the file size threshold, stashing the file within the intermediate storage device;
    responsive to the size of the file being above the file size threshold, sending, without stashing the file within the intermediate storage device, the file to the destination device; and
    updating the file size threshold based upon at least one of:
        a first measured throughput associated with sending the file to the destination device; or
        a second measured throughput associated with stashing the file within the intermediate storage device.

18. The computer-readable storage medium of claim 17, the destination device comprising an optical storage device.

19. The computer-readable storage medium of claim 17, the file size threshold based at least in part on at least one of a safety margin, tolerance value, throughput value, or a desired data transfer rate.

20. The computer-readable storage medium of claim 17, the intermediate storage device comprising a hard drive.

* * * * *